United States Patent
Tuzar et al.

(10) Patent No.: US 11,474,669 B2
(45) Date of Patent: Oct. 18, 2022

(54) OPERATING UNIT AND METHOD OF SETTING A PARAMETER OF A FUNCTIONAL UNIT OF A MOTOR VEHICLE

(71) Applicant: Faurecia Innenraum Systeme GmbH, Hagenbach (DE)

(72) Inventors: Gert-Dieter Tuzar, Hagenbach (DE); Frank Urban, Stadthagen (DE); Thomas Dessapt, Stadthagen (DE); Arnauld Rollet, Stadthagen (DE)

(73) Assignee: Faurecia Innenraum Systeme GmbH

(*) Notice: Subject to any disclaimer, the term of this patent is extended or adjusted under 35 U.S.C. 154(b) by 0 days.

(21) Appl. No.: 17/140,220

(22) Filed: Jan. 4, 2021

(65) Prior Publication Data
US 2021/0208745 A1 Jul. 8, 2021

(30) Foreign Application Priority Data
Jan. 3, 2020 (DE) .................. 10 2020 100 062.6

(51) Int. Cl.
| | | |
|---|---|---|
| *G06F 3/0482* | (2013.01) | |
| *G06F 3/0362* | (2013.01) | |
| *G06F 3/01* | (2006.01) | |
| *G06F 3/04847* | (2022.01) | |
| *B60K 35/00* | (2006.01) | |

(52) U.S. Cl.
CPC .......... *G06F 3/0482* (2013.01); *B60K 35/00* (2013.01); *G06F 3/016* (2013.01); *G06F 3/0362* (2013.01); *G06F 3/04847* (2013.01); *B60K 2370/126* (2019.05); *B60K 2370/152* (2019.05); *B60K 2370/158* (2019.05); *B60K 2370/162* (2019.05); *B60K 2370/774* (2019.05)

(58) Field of Classification Search
CPC .......... B60K 35/00; B60K 2370/126; B60K 2370/152; B60K 2370/158; B60K 2370/162; B60K 2370/774; G06F 3/016; G06F 3/0362; G06F 3/0482; G06F 3/04847
See application file for complete search history.

(56) References Cited

U.S. PATENT DOCUMENTS

| | | | |
|---|---|---|---|
| 2004/0095366 A1* | 5/2004 | Kawai | B60K 37/06 715/700 |
| 2010/0214213 A1* | 8/2010 | Bowden | B60K 37/06 345/157 |
| 2012/0013548 A1 | 1/2012 | Choi et al. | |
| 2017/0371429 A1* | 12/2017 | Tsai | G06F 3/0482 |
| 2019/0212909 A1 | 7/2019 | Napier et al. | |

FOREIGN PATENT DOCUMENTS

DE 102007004923 A1 8/2008

* cited by examiner

*Primary Examiner* — Nelson M Rosario
(74) *Attorney, Agent, or Firm* — Carlson, Gaskey & Olds, P.C.

(57) ABSTRACT

An operating unit for operating a plurality of functional units of a motor vehicle includes a screen display unit and an input unit. The input unit has at least two selection elements for selecting one of the functional units and has a setting element for making a setting on a selected functional unit. Furthermore, the operating unit is configured to display a setting state of a selected functional unit as a pop-up on the screen display unit. A method of setting a parameter of a functional unit of a motor vehicle is also provided.

18 Claims, 5 Drawing Sheets

OPERATING UNIT AND METHOD OF SETTING A PARAMETER OF A FUNCTIONAL UNIT OF A MOTOR VEHICLE

CROSS-REFERENCE TO RELATED APPLICATIONS

This application is a U.S. non-provisional application claiming the benefit of German Application No. 10 2020 100 062.6, filed on Jan. 3, 2020, which is incorporated herein by reference in its entirety.

TECHNICAL FIELD

The disclosure relates to an operating unit for operating a plurality of functional units of a motor vehicle, comprising a screen display unit and an input unit which is arranged spaced apart from the screen display unit and is coupled to the screen display unit in terms of signaling. In particular, the input unit is adapted to be mounted in a center console of the motor vehicle. The input unit comprises at least two selection elements, each of which is configured to select one of the functional units, and a setting element, which is arranged adjacent to the selection elements and is configured to make a setting on a selected functional unit.

The disclosure also relates to a method of setting a parameter of a functional unit of a motor vehicle.

BACKGROUND

Such operating units and methods are known from the prior art. They are used to make settings on a steadily increasing number of functional units of the motor vehicle. Examples of such functional units are air conditioning units for the interior of the motor vehicle, navigation systems, playback units for media files, for example audio systems, seat adjusters as well as ambient lighting units and scenting units for the interior of the motor vehicle. Further operator-related settings of functional units of the motor vehicle may also be made using such an operating unit. Due to the large number of functional units in modern motor vehicles and the large number of parameters that can be set for each functional unit, a large number of manual operating steps is frequently also required to make a particular setting. This large number of operating steps is usually accompanied by a correspondingly large number of displays on the screen display unit. These displays serve in particular to guide the operator of the motor vehicle through various selection menus.

SUMMARY

An improved operating unit is provided where settings on functional units of the motor vehicle are intended to be made quickly and easily. In particular, the number of manual operating steps and the number of representations on the screen display unit are intended to be kept as low as possible. Altogether, a cognitive load on the operator of the motor vehicle when making settings is to be reduced in this way.

The operating unit is configured to display a setting state of a selected functional unit as a pop-up on the screen display unit. The setting state is thus visualized by a graphical representation on the screen display unit. This graphical representation covers, at least in sections, representations that were visualized on the screen display unit before the pop-up was invoked. The representations that were present on the screen display unit before the pop-up was invoked continue to exist, but recede to the background or are partially covered by the pop-up. In particular, these representations are thus neither hidden nor completely replaced by the pop-up. As a result, the pop-up does not fully utilize the maximum possible display area of the screen display unit. Preferably, only one single pop-up can be displayed on the screen display unit at any one time. In this way, an operator of the motor vehicle receives an unequivocal visual indication of the part of the screen display unit to which he or she has to direct his or her attention. Particularly in the case of comparatively large-area screen display units, there is thus practically no need for him/her to search visually. As a result, the user can make the desired setting with a very low cognitive load. In the event that settings are to be made on a plurality of functional units, this can be performed sequentially. This, too, reduces the cognitive load on the operator of the motor vehicle. All in all, the result is a simple and intuitive operability.

The screen display unit may comprise a touch screen. This gives a user of the motor vehicle the additional option of making settings directly via the screen display unit. This may be affected in combination with the input unit or without using the input unit. Therefore, there are a plurality of alternatives available for making settings, so that the user of the motor vehicle can use any of these alternatives according to his or her preferences.

The screen display unit may be arranged in the region behind a steering wheel or centrally in the instrument panel.

Preferably, the setting element is a rotary push switch. Such setting elements have been tried and tested in the prior art. In particular, they can be actuated by an operator of the motor vehicle intuitively and without looking. This results in a low cognitive load when making settings, which can be carried out quickly and simply.

The pop-up may comprise a moving representation. In particular, the representation is in motion independently of an actuation of the setting element, i.e. it is in motion even when no new setting is currently being made but the setting has already taken place. An instantaneous setting state of the selected functional unit is thus visualized by a moving representation. For example, moving equalizer bars can be made use of for visualizing a setting state of an audio system. A setting state of an air conditioning unit, in particular a ventilation unit, can for example be represented by wafting bubbles or dots that symbolize an air flow. Moving representations are particularly easy to recognize and intuitively comprehensible for a user of the motor vehicle. Thus, the overall result is a simple and intuitive operability of the operating unit.

Alternatively or additionally, the pop-up comprises a representation that is dependent on an actuation of the setting element. A user of the operating unit may thus receive visual feedback on his/her instantaneous setting activity. Continuing the examples already mentioned, this can be done, for example, in that, as the setting element is moved, the equalizer bars move to the left or to the right. The number of wafting bubbles or dots can be varied dynamically, with a large number of bubbles or dots corresponding to a high intensity operation of the ventilation unit, and a small number of bubbles or dots corresponding to a low intensity operation of the ventilation unit while the setting element is moved. The user can thus identify quickly and easily which adjustment he/she is currently making or has made.

According to one embodiment, each selection element is dedicated to the functional unit that is selectable therewith. Alternatively, a functional unit may be freely assignable to at least one selection element. This is preferably performed by the operator of the motor vehicle. Generally, a specific selection element can thus be provided for those functional units that are used most frequently. This allows these functional units to be set quickly and easily. If a functional unit is freely assignable to at least one selection element, it is furthermore possible to adapt the operating unit to an operator's personal preferences. This makes operation particularly fast and pleasant. In addition, the operator can place the selection elements in the positions he was already familiar with from his/her previous car or, in a rental car, he/she can place the selection elements in positions he/she is familiar with from his/her own car.

The input unit may comprise a feedback unit for generating a tactile operator feedback. Such operator feedback is quick and intuitive to understand. In particular, a user need not look to receive such feedback.

Furthermore, a method is provided for setting a parameter of a functional unit of a motor vehicle, which comprises the steps of:

(a) selecting the functional unit to which the parameter to be set is assigned;

(b) displaying a current setting state of the selected functional unit via a pop-up; and (c) changing the parameter by actuating a setting element.

Here, the pop-up is displayed in particular on a screen display unit. A user of the motor vehicle can thus detect the current setting state quickly and easily. His or her cognitive load to do so is extremely low.

According to a variant, by a further actuation of the setting element, a setting state of a further parameter of the selected functional unit is displayed by a pop-up and can be set by the setting element. Settings can therefore also be made to several parameters of the selected functional unit. This is preferably done sequentially. The individual parameters of the selected functional unit are thus set one after the other. In the case of an air conditioning system, for example, in this way the temperature may be set first and then the desired ventilation intensity.

Advantageously, the pop-up is represented as moving. This results in the effects and advantages of the moving representation as already mentioned with respect to the operating unit.

BRIEF DESCRIPTION OF THE DRAWINGS

The disclosure will be discussed below with reference to various exemplary embodiments that are shown in the accompanying drawings, in which.

DETAILED DESCRIPTION

Figure 1:
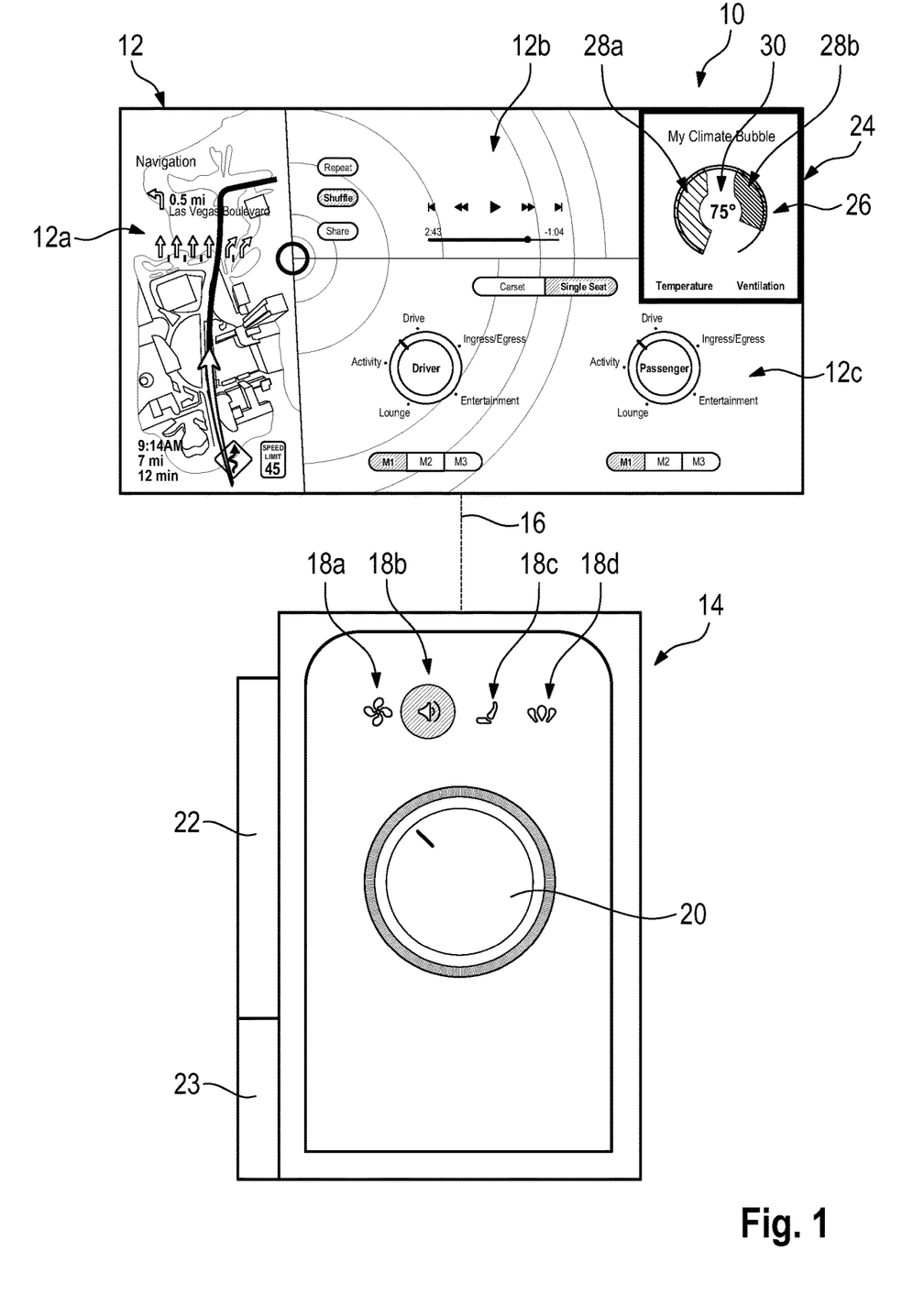
FIG. 1 shows an operating unit according to the disclosure, by which a method according to the disclosure can be carried out.

FIG. 1 shows an operating unit 10 for operating a plurality of functional units of a motor vehicle.

The operating unit 10 comprises a screen display unit 12, which, in the illustrated embodiment, is adapted to be mounted centrally in an instrument panel of the motor vehicle.

The operating unit 10 further includes an input unit 14, which is coupled to the screen display unit 12 via a signal line 16 in terms of signaling.

The input unit 14 is arranged so as to be spaced apart from the screen display unit 12 here. In the exemplary embodiment illustrated, the input unit 14 is mountable or mounted in a center console of the motor vehicle.

In alternative embodiments, the input unit 14 is mountable or mounted in a steering wheel, in a door lining or in an armrest.

The input unit 14 has a total of four selection elements 18a, 18b, 18c, 18d, which are configured as touch-sensitive surface portions. It is, however, also conceivable to construct the selection elements 18a to 18d as conventional push-button switches.

Each of the four selection elements 18a to 18d is configured to select one of the functional units of the motor vehicle.

In the illustrated embodiment, the selection element 18a is assigned to an air conditioning unit, the selection element 18b to an audio system, the selection element 18c to a seat adjuster, and the selection element 18d to an ambient lighting unit.

The aforementioned functional units can thus be operated by the operating unit 10. The assignment between the selection elements 18a to 18d and the functional units is fixed.

The input unit 14 furthermore comprises a setting element 20, which is in the form of a rotary push switch.

The setting element is arranged directly adjacent to the selection elements 18a to 18d and serves to make settings on a selected functional unit.

The input unit 14 further includes a feedback unit 22, illustrated only schematically, which is configured to generate a tactile operator feedback and may include, e.g., one or more electric motor-driven unbalanced masses.

The feedback unit 22 is coupled to the selection elements 18a to 18d and the setting element 20 in such a way here that a tactile operator feedback can be provided both via the selection elements 18a to 18d and via the setting element 20.

In addition, the operating unit 10 comprises a voice unit 23, illustrated only schematically, via which an actuation of one of the selection elements 18a to 18d and/or a setting made via the setting element 20 can be confirmed by a voice output.

As an alternative, the voice output may be affected through an audio system of the vehicle.

Furthermore, a voice output provided by the voice unit 23 may comprise a prompt to an operator of the motor vehicle.

Moreover, the voice unit 23 may be configured to actuate the operating unit 10 by voice commands. The voice unit 23 may thus be used as an alternative to the input unit 14.

In an alternative embodiment, the voice commands may be acquired and/or processed through the audio system of the vehicle.

The operating unit 10 can be actuated by the input unit 14 as follows.

In an initial state, a display on the screen display unit 12 comprises, e.g., three sub-areas.

In a first sub-area 12a, information associated with a navigation system is shown.

In a second sub-area 12b, there is a representation which, for one thing, serves to operate an audio system and, for another, contains information about an audio file currently played by the audio system.

In a third sub-area 12c, further operator-related setting options of the motor vehicle can be seen.

Starting therefrom, an operator of the motor vehicle, who wishes, for example, to change a set temperature specified for the air conditioning unit, actuates the selection element 18a that is assigned to the air conditioning unit. Therefore, by selecting the air conditioning unit, he/she selects that functional unit to which the parameter to be set is assigned.

As a result, a pop-up 24 will open on the screen display unit 12.

The pop-up partially overlies each of the sub-areas 12b and 12c, without affecting the respectively associated representations. The sub-area 12a remains fully visible and is not affected at all by the pop-up 24.

Figure 3:
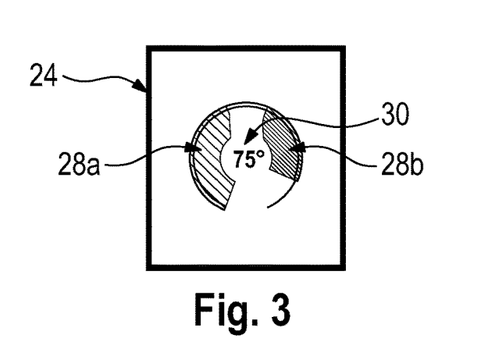
FIG. 3 shows a pop-up of the representation from FIG. 1 in a separate view.

The pop-up 24 comprises a moving representation 26 that visualizes a setting state of the selected functional unit.

In the illustrated example, the functional unit is an air conditioning unit, and the setting state relates to a set temperature that can be specified by the operator.

Here, a first moving display area 28a is provided, which is associated with cold temperatures and, for this reason, is a blue arc portion, for example. The edges of the first moving display area 28a are not static here, but move in a wave-like manner, for example. An irregular movement of the edges is likewise conceivable.

A second moving display area 28b is associated with warm temperatures and for this reason is, for example, a red arc section. The edges of the second moving display area 28b are also not static, but move in a wave-like manner or irregularly, for example.

The above-mentioned movements of the edges are more particularly independent of a current actuation of the setting element 20, i.e. the movement is also affected after the actuation and before a further actuation.

Furthermore, the representation comprises an alphanumeric display 30, which reproduces the specified set temperature as a numerical value.

An operator can now change the set temperature as desired by rotating the setting element 20.

He or she can thus, for example, increase the set temperature by turning the setting element 20 clockwise or reduce it by turning the setting element 20 counterclockwise.

In the process, the numerical value indicated by the alphanumeric display 30 changes accordingly.

The first moving display area 28a and the second moving display area 28b also respond to the setting element 20 being rotated.

For example, in the event that the operator raises the set temperature, the first moving display area 28a is reduced in size and the second display area 28b is increased in size. Raising the target temperature will thus make the surface portions depicted in red within the pop-up 24 larger and the surface portions depicted in blue smaller.

The pop-up 24 thus comprises both a moving representation 26, which is independent of the actuation of the setting element 20, and a representation that depends on an actuation of the setting element 20.

Generally, the operating unit 10 is configured to display a setting state of a selected functional unit as a pop-up 24 on the screen display unit 12.

Figure 2:
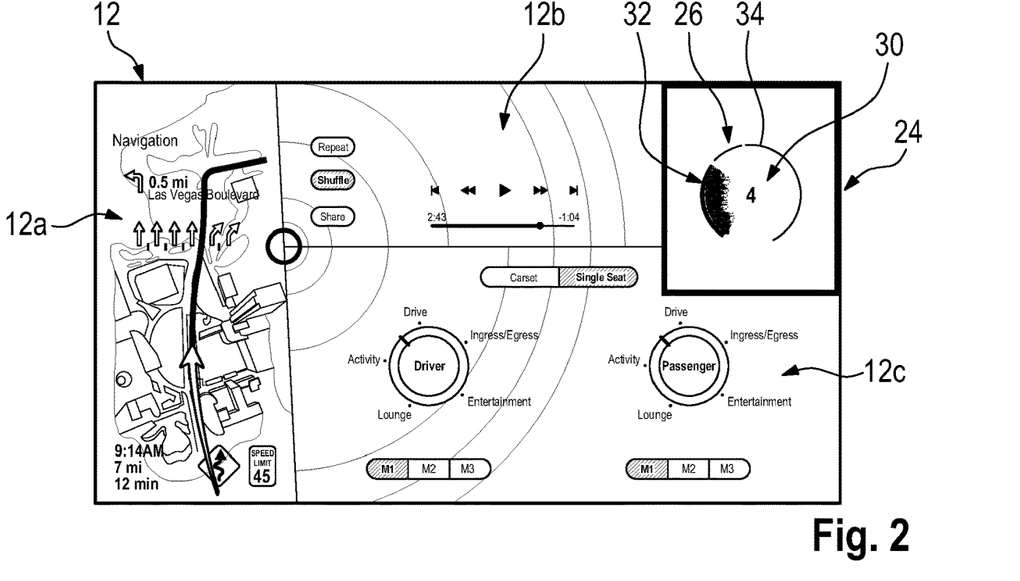
FIG. 2 shows a screen display unit of the operating unit from FIG. 1 with an alternative representation.

When the target temperature has been set as desired, the operator can have a further parameter of the selected functional unit, that is, the air conditioning unit, displayed via a pop-up 24 by pressing the setting element 20 and thereby make it settable using the setting element 20.

In the exemplary embodiment shown, the further parameter concerns an intensity of ventilation. The screen display unit 12 is illustrated with a respective pop-up 24 in FIG. 2.

The operator can now vary the intensity of the ventilation according to his/her wishes by turning the setting element 20.

Figure 4:
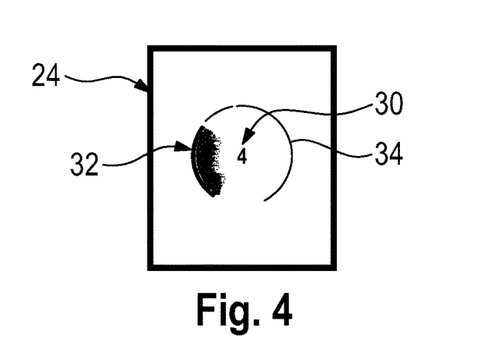
FIG. 4 shows a pop-up of the representation from FIG. 2 in a separate view.

Here, the pop-up 24 again comprises a moving representation 26, which in the embodiment illustrated in FIG. 2 consists of a quantity 32 of wafting blue dots. These dots symbolize ventilation.

Depending on the actuation of the setting element 20, this quantity 32 of wafting blue dots becomes larger or smaller along a circular contour 34.

The alphanumeric display 30 now shows a numerical setting level of the ventilation.

FIGS. 5 to 10 show alternative pop-ups 24.

Figure 5:
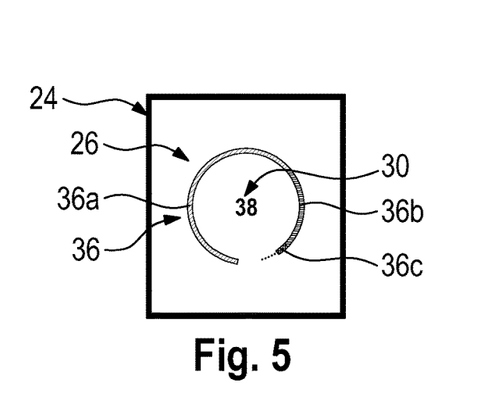
FIGS. 5 to 10 show further, alternative pop-ups.
Figure 6:
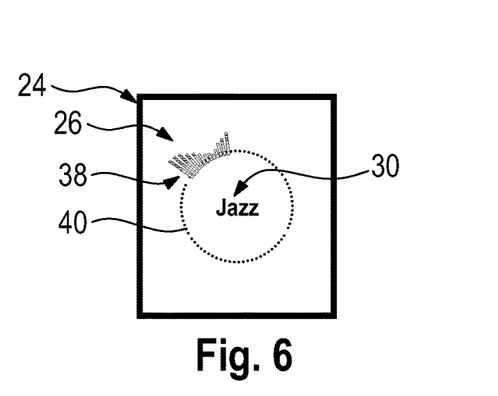

Here, the pop-ups 24 from FIGS. 5 and 6 are assigned to an audio system that can be selected using the selection element 18b.

The pop-up 24 from FIG. 5 pertains to adjustment of a volume.

It comprises a substantially circular line-shaped display 36, which is subdivided into a first circular line segment 36a, a second circular line segment 36b and a third circular line segment 36c.

Here, the circular line segment 36a is associated with comparatively low volume levels and, in particular, is shown in green color.

The circular line segment 36b is associated with medium volume levels. Preferably, it is depicted in yellow color.

The circular line segment 36c is associated with comparatively high volume levels and is depicted in red color, for example.

The boundaries between the individual circular line segments 36a, 36b, 36c are not static here, but move periodically to a small degree along an extent of the circular line-shaped display 36. This may also occur as a function of an audio file currently being played by the audio system, so that the movement occurs, for example, in time to a piece of music being played.

This means that the circular line-shaped display 36 is a moving representation 26.

The volume can be varied by rotating the setting element 20.

The circumferential lengths of the individual circular line segments 36a, 36b, 36c are also dependent on an actuation of the setting element 20.

In the event that a particularly high volume is set, the circular line segment 36c is shown as being comparatively large, whereas the circular line segments 36a and 36b are shown as being only very small.

Conversely, if a comparatively low volume is set, the circular line segment 36a is depicted as being comparatively large and the circular line segments 36b and 36c are depicted as being only comparatively small.

By pressing the setting element 20, a pop-up 24 as shown in FIG. 6 can be invoked, which can be used to make an equalizer setting of the audio system.

Here, the representation of the pop-up 24 comprises equalizer bars 38 that dynamically change in size and are positioned on a circular line 40. In this regard, the dynamic change in size of the equalizer bars 38 is independent of an actuation of the setting element 20. This may occur as a function of an audio file currently being played by the audio system, so that the movement occurs, for example, in time to a piece of music being played.

Turning the setting element 20 causes the equalizer bars 38 to shift along the circular line 40, with a counterclockwise shift being associated with, for example, a bass boost and a clockwise shift being associated with a treble boost.

The alphanumeric display 30 indicates a name of a style of music that harmonizes particularly well with the equalizer setting that has been made.

Figure 7:
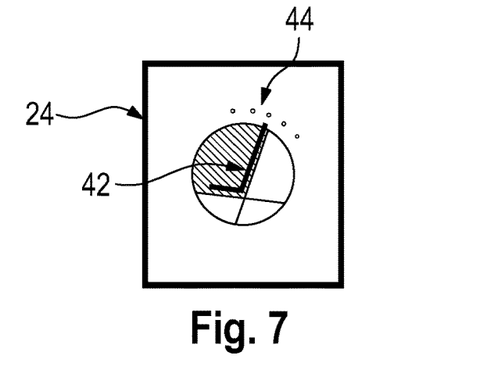
Figure 8:
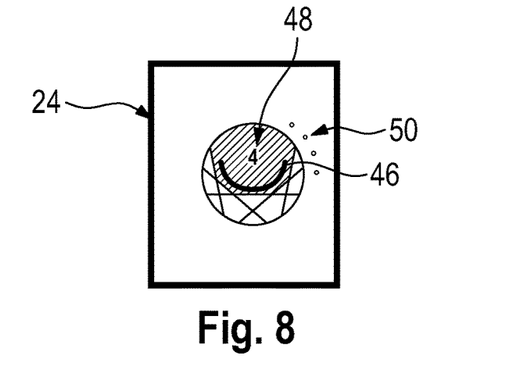

FIGS. 7 and 8 each show a pop-up 24 assigned to a seat setting. These pop-ups 24 may be displayed on the screen display unit 12 by actuating the selection element 18*c*.

The pop-up shown in FIG. 7 comprises a schematic illustration of a seat 42 and a group 44 of dots that each correspond to an adjustment position of the backrest of the seat 42.

The position of the backrest can now be varied by rotating the setting element 20, with the backrest of the seat 42 represented within the pop-up 24 also moving in accordance with the actuation of the setting element 20.

The pop-up 24 according to FIG. 8 is invoked by pressing the setting element 20.

This pop-up 24 is associated with the setting of the lateral support. It comprises a schematic representation of a backrest 46 and an alphanumeric display 48. Further illustrated is a group 50 of dots that symbolize different setting states.

By rotating the setting element 20, the lateral support of the seat can be increased or decreased. The illustrated backrest 46 will change its shape accordingly, with an end of the backrest 46 shown on the right in the illustration in FIG. 8 always pointing to one of a plurality of circumferentially arranged, spaced dots of the group 50, thus visualizing a selected setting. In the alphanumeric display 48, the lateral support is indicated by a numerical degree of support.

Figure 9:
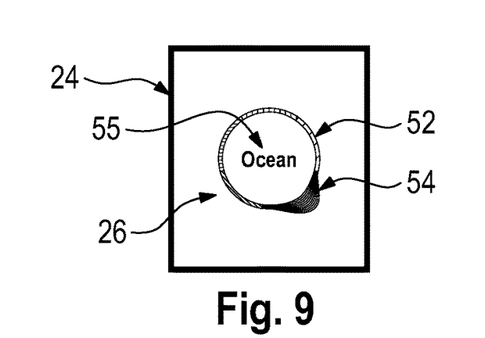
Figure 10:
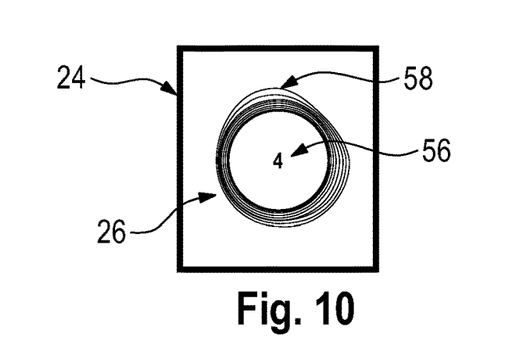

The pop-ups 24 from FIGS. 9 and 10 are assigned to the ambient lighting unit that can be selected using the selection element 18*d*.

Here, the pop-up 24 of FIG. 9 serves for setting a lighting color. The representation within the pop-up 24 essentially comprises a circular line 52, which is provided with a thickened portion 54 at one point. The circular line 52 is subdivided into a plurality of circular line segments here that differ in color.

The circular line segment provided with the thickened portion 54 is the one that corresponds to the currently set lighting color.

Furthermore, a name of the currently set lighting color is indicated by the alphanumeric display 55.

By rotating the setting element 20, the illumination color can be changed. Depending on the direction of rotation of the setting element 20, the thickened portion 54 also moves along the circular line 52.

Furthermore, the edges of the individual circular line segments are not static, but move in a slow, wafting motion.

This means that the representation comprising the circular line 52 and the thickened portion 54 is a moving representation 26.

The pop-up 24 according to FIG. 10 is also assigned to the ambient lighting unit. It can be invoked by pressing the setting element 20 if the pop-up according to FIG. 9 can be previously seen in the screen display unit 12.

The pop-up 24 according to FIG. 10 concerns the setting of the intensity of the ambient lighting.

This intensity is indicated, for one thing, by a numerical value in the alphanumeric display 56.

Furthermore, the intensity is visualized by a group 58 of annular lines.

These annular lines are arranged substantially concentrically. When the intensity of the lighting is increased by rotating the setting element 20, the number of annular lines increases. When the intensity of the lighting is decreased, likewise by rotating the setting element 20, the number of annular lines decreases accordingly.

In addition, the annular lines also move independently of an actuation of the setting element 20 by periodically deforming starting from a circular shape, as shown in FIG. 10.

The group 58 of annular lines thus also forms a moving representation 26.

Figure 11:
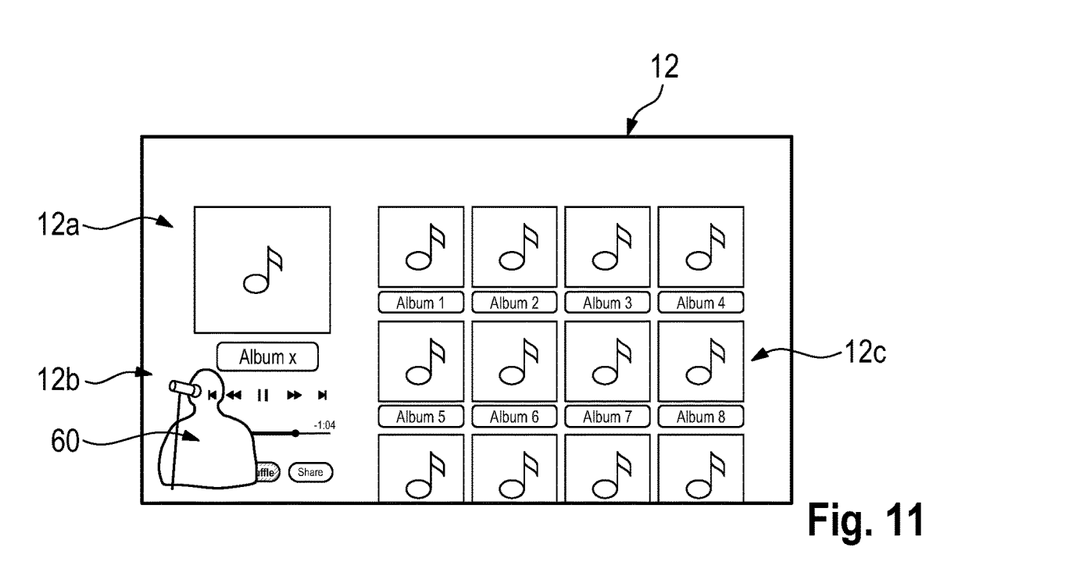
FIG. 11 shows an alternative representation on the screen display unit from FIG. 1.

FIG. 11 shows the screen display unit 12 in an alternative initial state.

Here, all sub-areas 12*a*, 12*b*, 12*c* of the screen display unit 12 are occupied by representations of the audio system; compared with the representations of FIGS. 1 and 2, the boundaries between the sub-areas 12*a*, 12*b*, 12*c* also run differently.

The first sub-area 12*a* now comprises a representation of a cover picture of a currently playing music album.

In the second sub-area 12*b*, a picture of the associated artist is visible. It is overlaid by control buttons 60 of the audio system.

The control buttons 60 can be operated by touching the screen display unit 12 if the latter comprises a touch screen. Otherwise, the control buttons 60 can be operated by the setting element 20.

In the third sub-area 12*c*, an audio library including various cover pictures of available audio albums can be seen.

It will be appreciated that the assignment of the individual representations to the sub-areas 12*a*, 12*b*, 12*c* is variable. It is therefore possible, in particular, to depict the control buttons 60 and the artist's picture located behind them in other sub-areas 12*a*, 12*b*, 12*c* as well.

Figure 12:
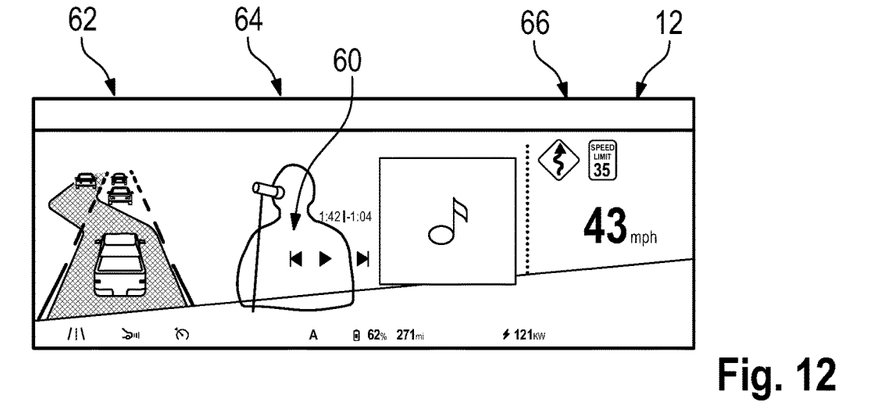
FIG. 12 shows a variant of the representation from FIG. 11.

In FIG. 12, the screen display unit 12 is illustrated in an additional alternative initial state.

Here, a display of the navigation system is provided in a left-hand sub-area 62 of the screen display unit 12, a display for the audio system is provided in a middle sub-area 64, and displays relating to the driving speed are provided in a right-hand sub-area 66.

Again, the control buttons 60 of the audio system overlie a picture of the artist.

Figure 13:
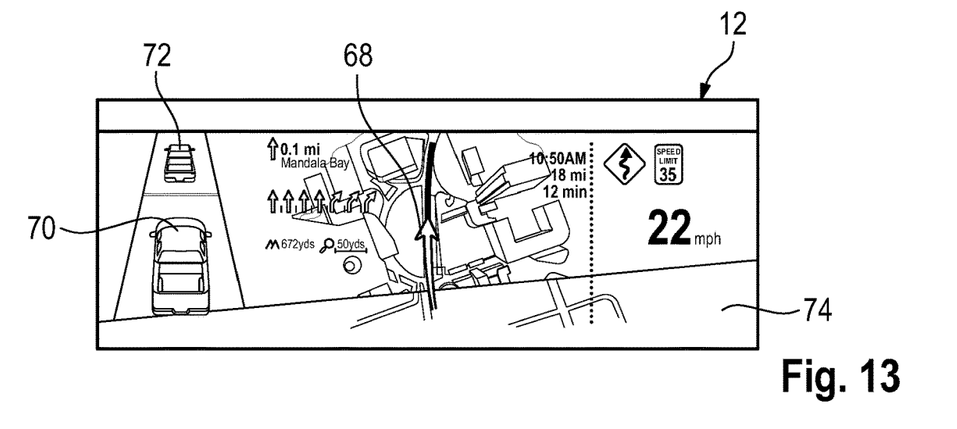
FIGS. 13 to 16 show additional, alternative representations on the screen display unit from FIG. 1.
Figure 14:
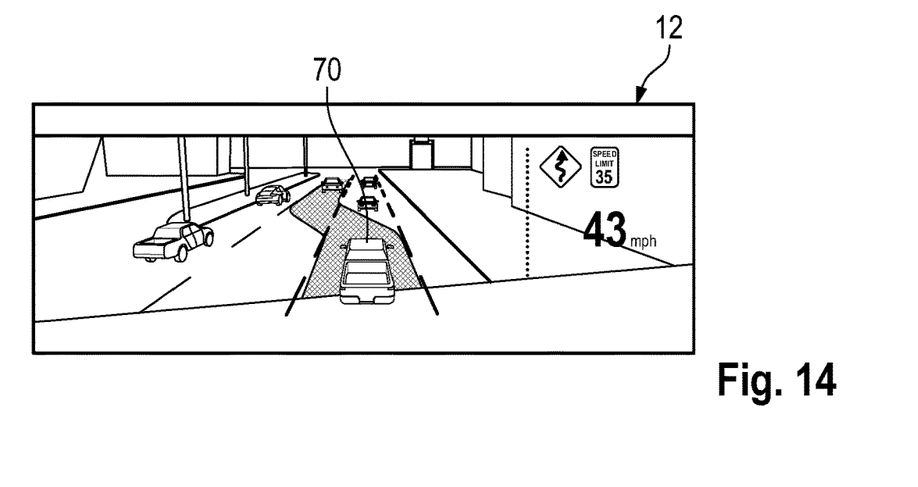

FIGS. 13 and 14 show the screen display unit 12 in further alternative initial states.

Here, the illustration in FIG. 13 is associated with a manual mode of operation of the motor vehicle and the illustration in FIG. 14 is associated with an autonomous mode of operation.

In the manual mode of operation, the position of the motor vehicle (own position) is represented, on the one hand, by an arrow 68 which can be seen from a comparatively large distance from above in a street map or road map, in order to give the driver a large overview.

On the other hand, the position of the motor vehicle (own position) is symbolized by the representation of a motor vehicle 70, with an actually currently preceding vehicle 72 being additionally displayed, which is in the same lane as the motor vehicle 70 and has been detected via sensors.

In the autonomous mode of operation, i.e. the vehicle steers itself, the representation on the screen display unit 12 is generally three-dimensional.

The operator assumes a bird's eye view and looks at the motor vehicle 70, which visualizes its own position. In the three-dimensional representation, further lanes with vehicles driving on them as well as nearby buildings can be seen.

In the event that an operator switches from the autonomous mode of operation to the manual mode of operation, the representation from FIG. 14 slowly and continuously transitions to the representation from FIG. 13. The transition here corresponds to a slow zooming out.

Analogously, when an operator switches from the manual mode of operation associated with the representation in FIG. 13 to the autonomous mode of operation, the representation from FIG. 13 then slowly and continuously transitions to the representation from FIG. 14, which corresponds to a slow zooming in.

Particularly in the manual mode of operation (FIG. 13), the representation on the screen display unit 12 may also be utilized for an intuitive visualization of a current energy consumption of the motor vehicle.

Such a display is useful in particular in electrically driven motor vehicles, in which an instantaneous energy consumption cannot be perceived by an operator indirectly based on a soundscape caused by the drive motor.

For these purposes, the representation section 74 is used, which is illustrated at the bottom of FIG. 13 and is set off from the rest of the representation, e.g. in color (here, it rises in a wedge shape to the right).

In this case, the area of this representation section 74 and in particular the height thereof at the right edge of the screen display unit 12 is designed as a measure of a current energy consumption of the motor vehicle.

Figure 15:
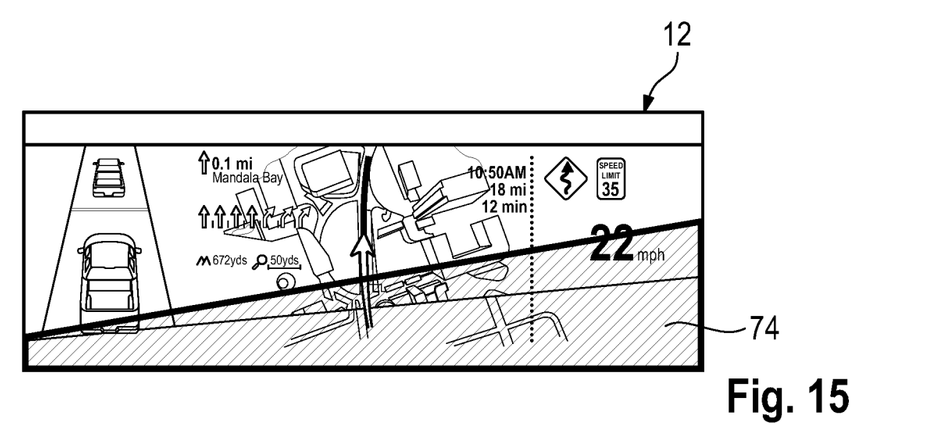

That is, in the event that energy consumption increases starting from the operating situation in FIG. 14, the representation section 74 becomes larger in terms of both its surface area and its height at the right edge of the screen display unit 12 (see dash-dotted area in FIG. 15).

Similarly, the representation section 74 is reduced in surface area and height at the right edge of the screen display unit 12 (see dash-dotted area in FIG. 16) when the instantaneous energy consumption decreases compared to the operating situation shown in FIG. 13.

In addition, the representation section 74 may also be used to provide a driving situation-adequate representation on the screen display unit 12.

Figure 16:
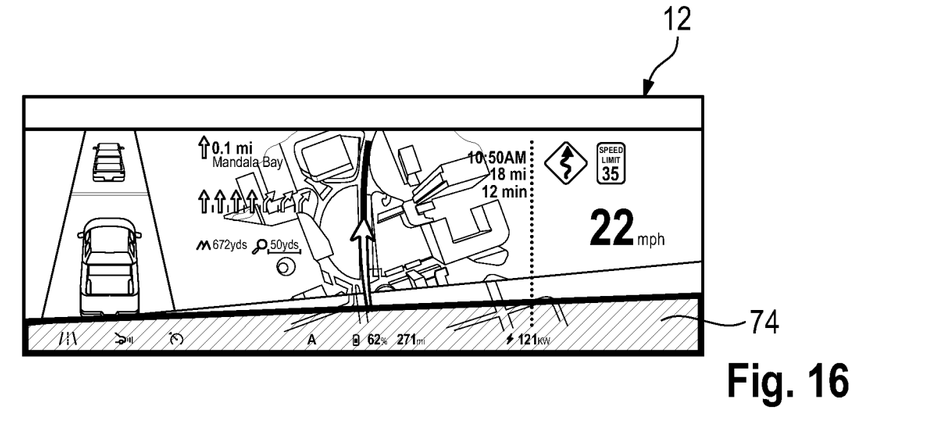

In FIGS. 13, 15 and 16, it can be seen that the representation on the screen display unit 12 is divided into two parts. In the representation section 74, there is a comparatively low-detail and two-dimensional representation.

In the remaining area of the screen display unit 12, the representation is rich in detail and comprises three-dimensional elements as well.

Now, depending on the driving situation, the proportion that the representation section 74 occupies on the screen display unit 12 can be varied. In other words, the boundary between the representation section 74 and the rest of the representation can be shifted.

It is thus possible, for example at high speed or in the case of an incoming telephone call, to largely or fully display to the operator of the motor vehicle the low-detail, two-dimensional representation. In this way, the cognitive load on the operator by the screen display unit 12 is reduced.

In the case of slow travel and/or when no other functional units of the motor vehicle currently require the attention of the operator or when driving autonomously, the operator can be offered a representation rich in detail with three-dimensional elements.

It will be appreciated that the setting and/or display options of the operating unit and/or the method of setting according to FIGS. 3 to 17 constitute independent inventive ideas even when considered separately, without the pop-up display.

Although various embodiments have been disclosed, a worker of ordinary skill in this art would recognize that certain modifications would come within the scope of this disclosure. For that reason, the following claims should be studied to determine the true scope and content of this disclosure.

The invention claimed is:

1. An operating unit for operating a plurality of functional units of a motor vehicle, comprising:
 a screen display unit; and
 an input unit which is arranged spaced apart from the screen display unit and is coupled to the screen display unit in terms of signaling;
 wherein the input unit comprises at least two selection elements, each of which is configured to select one of the plurality of functional units, and a setting element, which is arranged adjacent to the at least two selection elements and is configured to make a setting on a selected functional unit of the plurality of functional units;
 wherein the operating unit is configured to display a setting state of the selected functional unit as a pop-up on the screen display unit; and
 wherein the pop-up partially covers representations that were visualized on the screen display unit before the pop-up was invoked, and wherein portions of the representations on the screen display unit not covered by the pop-up remain on the screen display unit while the pop-up is being displayed.

2. The operating unit according to claim 1, wherein the setting element is a rotary push switch.

3. The operating unit according to claim 1, wherein the pop-up comprises a moving representation.

4. The operating unit according to claim 3, wherein the moving representation is in motion independently of an actuation of the setting element.

5. The operating unit according to claim 1, wherein the pop-up comprises a representation that is dependent on an actuation of the setting element.

6. The operating unit according to claim 1, wherein each selection element is dedicated to the functional unit that is selectable therewith.

7. The operating unit according to claim 1, wherein a functional unit of the plurality of functional units is freely assignable to at least one selection element of the at least two selection elements.

8. The operating unit according to claim 1, wherein the input unit comprises a feedback unit for generating a tactile operator feedback.

9. The operating unit according to claim 1, wherein the input unit is adapted to be mounted in a center console of the motor vehicle.

10. A method of setting a parameter of a functional unit of a motor vehicle, comprising the steps of:
 (a) selecting the functional unit to which the parameter to be set is assigned;
 (b) displaying a current setting state of the selected functional unit on a screen display unit via a pop-up that partially covers representations that were visualized on the screen display unit before the pop-up was invoked, wherein portions of the representations on the screen display unit not covered by the pop-up remain on the screen display unit while the pop-up is being displayed; and
 (c) changing the parameter by actuating a setting element.

11. The method according to claim 10, wherein, by a further actuation of the setting element, a setting state of a further parameter of the selected functional unit is displayed via a pop-up and can be set by the setting element.

12. The method according to claim 10, wherein the pop-up is represented as moving.

13. The method according to claim 10, wherein the functional unit of the motor vehicle comprises a plurality of functional units, and including providing a selection element on an input unit for each one of the plurality of functional units.

14. The method according to claim 13, including changing the parameter of each of the functional units using the same setting element.

15. The method according to claim 14, wherein the setting element is separate from the selection elements.

16. The method according to claim 13, including spacing the input unit apart from the screen display unit and coupling the input unit to the screen display unit via signaling.

17. An operating unit for operating a plurality of functional units of a motor vehicle, comprising:

a screen display unit; and an input unit which is arranged spaced apart from the screen display unit and is coupled to the screen display unit in terms of signaling;

wherein the input unit comprises at least two selection elements, each of which is configured to select one of the plurality of functional units, and a setting element, which is arranged adjacent to the at least two selection elements and is configured to make a setting on a selected functional unit of the plurality of functional units;

wherein one selection element is provided on the input unit for each one of the plurality of functional units such that each selection element is dedicated to the functional unit that is selectable therewith;

wherein the operating unit is configured to display a setting state of the selected functional unit as a pop-up on the screen display unit; and wherein the pop-up partially covers representations that were visualized on the screen display unit before the pop-up was invoked.

18. The operating unit according to claim 17, wherein the parameter of each of the functional units is changed using the same setting element.

* * * * *